United States Patent [19]
Willey

[11] Patent Number: 6,072,987
[45] Date of Patent: Jun. 6, 2000

[54] METHOD FOR TRANSMITTING AND RECEIVING ADDRESS INFORMATION WITHIN A COMMUNICATION SYSTEM

[75] Inventor: William Daniel Willey, Arlington Heights, Ill.

[73] Assignee: Motorola, Inc., Schaumburg, Ill.

[21] Appl. No.: 09/283,352

[22] Filed: Mar. 31, 1999

Related U.S. Application Data

[60] Provisional application No. 60/100,036, Sep. 11, 1998.

[51] Int. Cl.[7] ............................. H04B 7/00; H04Q 3/02; G08C 17/00; H04S 3/24; G08B 5/22
[52] U.S. Cl. .................... 455/38.2; 455/38.1; 455/574; 370/311; 370/349; 370/337; 340/825.44
[58] Field of Search .................................. 455/343, 38.3, 455/38.1, 38.2, 574; 370/349, 311, 337, 475; 340/825.44

[56] References Cited

U.S. PATENT DOCUMENTS

| 4,996,526 | 2/1991 | Deluca et al. | 340/825.44 |
|---|---|---|---|
| 5,150,361 | 9/1992 | Wieczorek et al. | 455/343 |
| 5,265,270 | 11/1993 | Stengel et al. | 455/343 |
| 5,371,737 | 12/1994 | Nelson et al. | 370/314 |
| 5,376,975 | 12/1994 | Romero et al. | 455/343 |
| 5,493,282 | 2/1996 | Petreye et al. | 340/827.27 |
| 5,537,457 | 7/1996 | Lantto et al. | 455/458 |
| 5,570,369 | 10/1996 | Jokinen | 370/311 |
| 5,596,624 | 1/1997 | Armbruster et al. | 455/435 |
| 5,666,657 | 9/1997 | Kampe et al. | 455/38.3 |

FOREIGN PATENT DOCUMENTS

| 2290399 | 12/1995 | United Kingdom | 455/38.3 |
|---|---|---|---|

*Primary Examiner*—Dwayne D. Bost
*Assistant Examiner*—Raymond B. Persino
*Attorney, Agent, or Firm*—Kenneth A. Haas

[57] ABSTRACT

The first frame of a paging slot (405) contains a portion of every page's (401–404) address. Likewise, the second, third, and fourth frames of the slot (405) contain a second, third, and fourth portion from each of the paging addresses. Address information is organized in the atomic frames of the slot (405) in such a way that the information in the earliest frame gives the mobile a high probability that it can determine that no messages directed to it are present in the slot. After receiving a first frame, a mobile station uses known partial address comparison techniques to determine if the mobile station has a page pending.

17 Claims, 8 Drawing Sheets

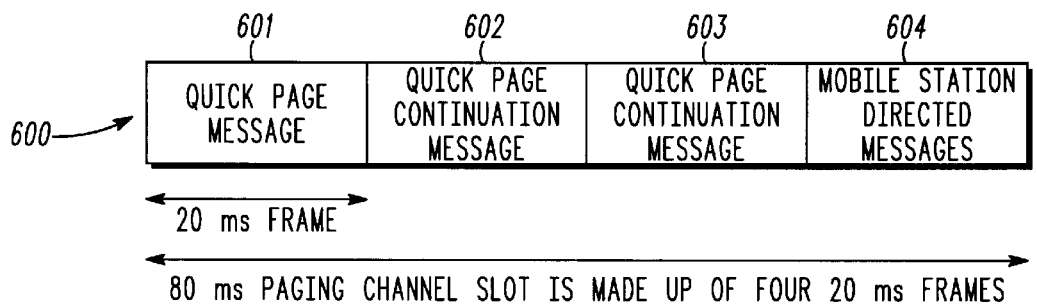
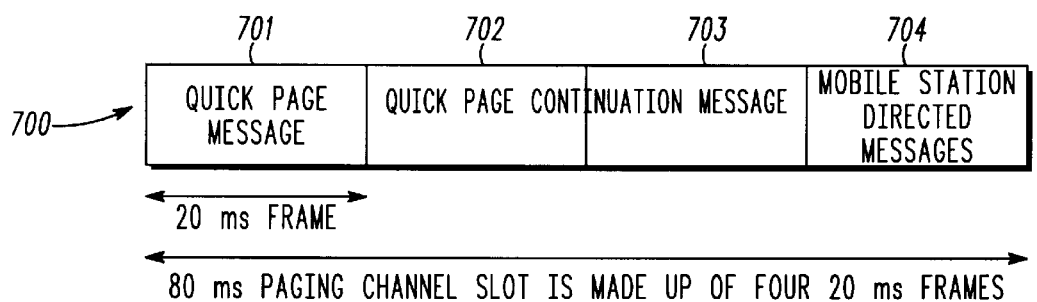
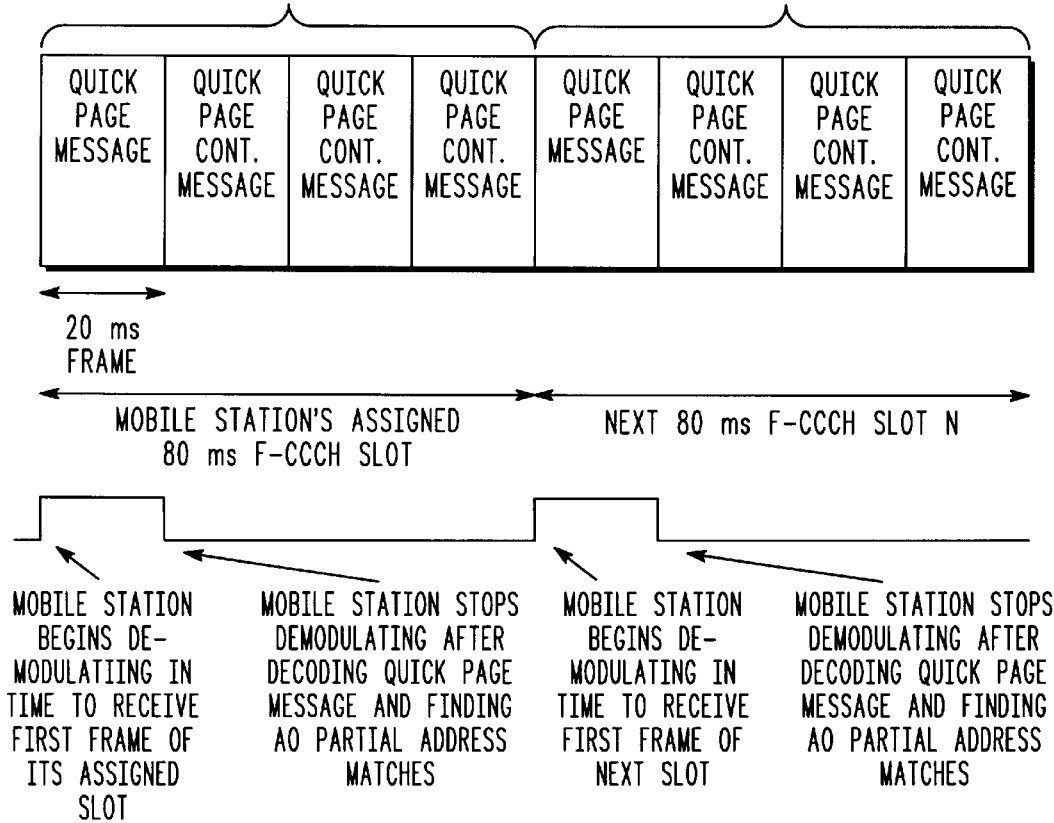

| | | | | | | | | | | | | |
|---|---|---|---|---|---|---|---|---|---|---|---|---|
| 1 | 0 | 0 | 0 | 10 | 0 | 1 | 1 | 10 | 0 | 1 | 1 |
| 2 | 1 | 0 | 0 | 3 | 1 | 1 | 0 | 3 | 1 | 1 | 0 |
| 3 | 1 | 1 | 0 | 4 | 1 | 1 | 0 | 4 | 1 | 1 | 0 |
| 4 | 1 | 1 | 0 | 8 | 1 | 1 | 0 | 8 | 1 | 1 | 0 |
| 5 | 0 | 0 | 1 | 5 | 0 | 0 | 1 | 5 | 0 | 0 | 1 |
| 6 | 1 | 0 | 1 | 6 | 1 | 0 | 1 | 6 | 1 | 0 | 1 |
| 7 | 0 | 0 | 0 | 9 | 1 | 0 | 1 | 9 | 1 | 0 | 1 |
| 8 | 1 | 1 | 0 | 1 | 0 | 0 | 0 | 1 | 0 | 0 | 0 |
| 9 | 1 | 0 | 1 | 2 | 1 | 0 | 0 | 2 | 1 | 0 | 0 |
| 10 | 0 | 1 | 1 | 7 | 0 | 0 | 0 | 7 | 0 | 0 | 0 |
| 11 | 0 | 0 | 0 | 11 | 0 | 0 | 0 | 11 | 0 | 0 | 0 |
| 12 | 1 | 0 | 0 | 12 | 1 | 0 | 0 | 12 | 1 | 0 | 0 |
| INITIAL ORDER | | | | ORDER AFTER REORDERING | | | | ORDER AFTER REORDERING | | | |

F-CCCH SLOTS

MOBILE STATION DUTY CYCLE FOR DEMODULATING F-CCCH FRAMES IS GREATLY REDUCED BY USING PARTIAL ADDRESS COMPARISION FOR BOTH THE SUSPENDED VIRTUAL TRAFFIC SUBSTATE AND FOR WHEN A PACA CALL IS QUEUED 6,072,987

METHOD FOR TRANSMITTING AND RECEIVING ADDRESS INFORMATION WITHIN A COMMUNICATION SYSTEM

The present application is based on prior U.S. application Ser. No. 60/100,036, filed on Sep. 11, 1998, which is hereby incorporated by reference, and priority thereto for common subject matter is hereby claimed.

FIELD OF THE INVENTION

The present invention relates generally to communication systems and, in particular, to a method for transmitting and receiving address information within a communication system.

BACKGROUND OF THE INVENTION

Many conventional receivers "wake up" periodically to determine if any messages (pages) are scheduled to be transmitted to the receiver. If no messages are scheduled, the receiver will power down in order to extend the battery life of the receiver. One such communication system currently being developed with such power-saving capabilities is the next generation Code-Division Multiple-Access (CDMA) cellular communication system, more commonly referred to as cdma2000, or Wideband CDMA. As illustrated in FIG. 1, cdma2000 utilizes a plurality of 20 millisecond (ms) synchronous frames 102 (shown as $F_0, F_1, F_2, \ldots, F_K$). Frames 102 are transmitted during a periodically occurring time span corresponding to a transmission cycle which has a predetermined duration (e.g., $1.28*2^N$ seconds, where N is zero or a positive integer). A mobile station within a cdma2000 system is assigned a group of four frames (referred to as a slot) in which all messages for the particular mobile station are to be transmitted. A mobile station operating as such is said to be operating in a "slotted mode." Slotted mode operation allows a cdma2000 mobile station to power up for a single assigned paging slot every $1.28*2^N$ seconds.

In order to further conserve power, all addresses for mobile stations that are to receive messages during a particular slot are broadcast prior to broadcasting page data. If a mobile station's address is not broadcast, the mobile station can power down for the remainder of the slot. FIG. 2 shows slot 200 having four frames. As shown, a first portion 201 of slot 200 contains address information for all mobile stations that have page data within slot 200. A particular mobile station assigned to slot 200 will awake during the transmission time for slot 200. The mobile station will receive the first frame, and if the mobile station's address is not contained within the first portion 201 of slot 200, the mobile station will power down prior to receiving the rest of slot 200.

During situations where many mobile stations assigned to a slot are being paged, the address information may be contained in a time period greater than a single frame. Because of this, address information may be contained within a second frame of the slot. This is illustrated in FIG. 3, where a first portion 301 (containing address information) of slot 300 is actually contained within two frames. Because information contained within a slot is encoded using codes such as convolutional codes before it is interleaved, a mobile station needs to receive the whole frame's content all at the same time. Thus, when address information is contained within two frames, a mobile station will need to receive and decode two frames prior to powering down. Thus, a mobile station will actually be powered up for the whole duration of the second frame, when only a portion of that frame contains address information. Thus a need exists for a method for transmitting and receiving address information within a communication system that does not require a mobile station to receive and decode frames containing very little address information.

BRIEF DESCRIPTION OF THE DRAWINGS

FIG. 6 shows the organization of a slot in accordance with a first embodiment of the present invention.

FIG. 7 shows the organization of a slot in accordance with a second embodiment of the present invention.

FIG. 8 shows an example of how partial address comparison can be used to increase battery life when all messages for an assigned slot do not fit into the slot.

DETAILED DESCRIPTION OF THE DRAWINGS

Figure 1:
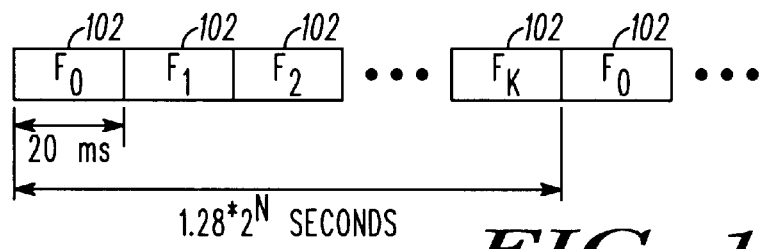
FIG. 1 is an illustration of a prior-art transmission scheme for cdma2000.
Figure 2:
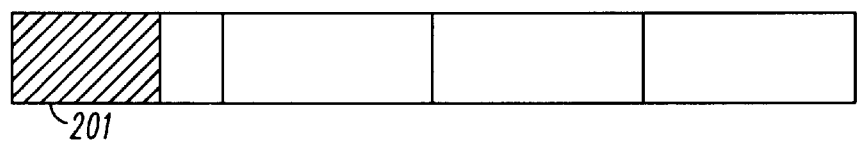
FIG. 2 is an illustration of a prior-art transmission scheme.
Figure 3:
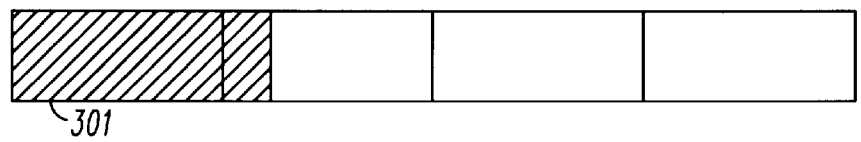
FIG. 3 is an illustration of a prior-art transmission scheme.

To address the need for transmitting and receiving address information within a communication system, a method for transmitting and receiving address information is provided. The first frame of a paging slot contains a portion of every pending page's address. Likewise, the second, third, and fourth frames of the slot contain a second, third, and fourth portion from each of the pending paging addresses. Address information is organized in the atomic frames of the slot in such a way that the information in the earliest frame gives the mobile a high probability that it can determine that no messages directed to it are present in the slot. After receiving the information bits from a first frame, a mobile station uses known partial address comparison techniques to determine if the mobile station has a page pending. When there is no page in the slot for the mobile station, the probability (assuming that address bits in the frame are random) that the mobile station is allowed to stop demodulating the F-CCCH after the first frame is: $(1-\frac{1}{256})^4 = 98.4\%$.

The present invention encompasses a method for transmitting address information within a communication system to mobile stations assigned to a slot. In the preferred embodiment of the present invention the slot is utilized to transmit messages to the mobile stations assigned to the slot. The method comprises the steps of determining a subset of the mobile stations that require messaging within the slot and determining addresses for all mobile stations within the subset. A first address portion for each mobile station within the subset is transmitted within a first frame of the slot. The address portion for a mobile station comprises a portion of the mobile station's address that is less than the whole of the address for the mobile station.

The present invention additionally encompasses a method for transmitting address information within a communication system. The method comprises the steps of determining a first address of a first type for a first mobile station assigned to a paging slot and determining a second address of a first type for a second mobile station assigned to the paging slot. In the preferred embodiment of the present invention a portion of the first address of the first type and a portion of the second address of the first type is transmitted within a first frame of the slot to the first and the second mobile stations.

The present invention additionally encompasses a method for transmitting address information within a communication system to a group of mobile stations assigned to a slot utilized to transmit messages. The method comprises the steps of determining a subset of the group of mobile stations that require paging within the slot, determining addresses for mobile stations within the subset, and grouping the mobile stations within the subset into groups of mobile stations having the same least significant address bits. The plurality of grouped mobile stations are sorted according to a number of members, and a first address portion for each mobile station within the subset is transmitted within a first frame of the slot. In the preferred embodiment of the present invention the first address portion for a mobile station comprises a portion of the mobile station's address that is less than the whole of the address for the mobile station and the grouped mobile stations having a fewest number of members will have a larger number of partial address bits within the first frame.

Finally, the present invention encompasses a method for receiving address information within a communication system. The method comprises the steps of determining a slot time to receive messages, and receiving within a first frame of the slot, a first address portion for a plurality of mobile stations. In the preferred embodiment of the present invention the first address portion for an individual mobile station from the plurality comprises a portion of the mobile station's address that is less than the whole of the address for the mobile station. The mobile station performs partial address comparison techniques to determine if the mobile station has a message pending within the slot.

Figure 4:
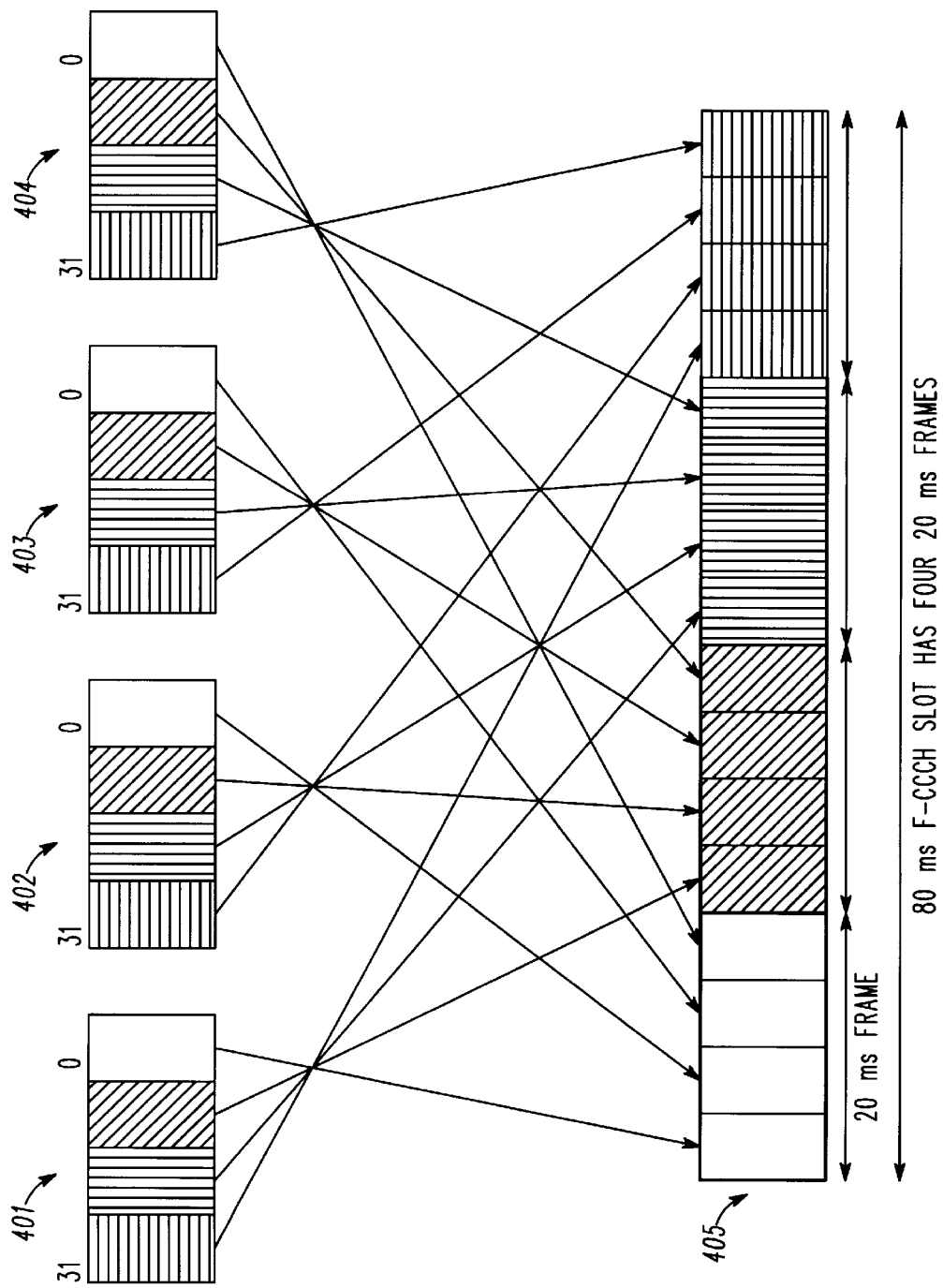
FIG. 4 is an illustration of a slot having address information in accordance with the preferred embodiment of the present invention.

Turning now to the drawings, where like numerals designate like components, FIG. 4 is an illustration of slot 405 having address information in accordance with the preferred embodiment of the present invention. Within FIG. 4 four 32-bit messages (401–404) are being sent in a slot which is made up of four atomic frames. In cdma2000 messages are usually sent out on a paging channel, commonly referred to as a Forward Common Control Channel (F-CCCH). For simplicity, in FIG. 4 all 32 bits of each message are address bits and each frame contains 32 bits, however as one of ordinary skill in the art will recognize, messages 401–404 may contain other information such as such as the SPECIAL_SERVICE, and SERVICE_OPTION fields, for example. In the preferred embodiment of the present invention address information for messages is included earliest in the F-CCCH slot, followed by other message-related information.

As shown the first frame of slot 405 contains a portion of every page's (e.g., messages 401–404) address. In FIG. 4, the first frame of slot 405 contains a first portion (eight bits) from each of the four addresses. Likewise, the second, third, and fourth frames of slot 405 contain a second, third, and fourth portion (each containing eight bits) from each of the four addresses. Address information is organized in the atomic frames of slot 405 in such a way that the information in the earliest frame gives the mobile a high probability that it can determine that no messages directed to it are present in the slot.

After receiving a first frame, a mobile station uses known partial address comparison techniques to determine if the mobile station has a message pending. Thus, a mobile station has a high probability that it does not need to decode any other frame to determine if it has a message pending. Partial address comparison is known in the art. Such a technique for receiving page addresses is described in detail in U.S. Pat. No. 5,666,657 METHOD IN A SELECTIVE CALL RECEIVER FOR APPLYING CONDITIONAL PARTIAL ADDRESS CORRELATION TO A MESSAGE, by Kampe et al., and incorporated by reference herein. In the preferred embodiment of the present invention a mobile station compares the eight bits from each of the four messages to the corresponding eight bits of its address using known techniques. If none of the comparisons yields a match, the mobile station is guaranteed that there is no message addressed to it contained in the slot; the mobile station can then stop demodulating the F-CCCH for the remainder of the slot.

When there is no message in the slot for the mobile station, the probability (assuming that address bits in the frame are random) that the mobile station is allowed to stop demodulating the F-CCCH after the first frame is: $(1-1/256)^4 = 98.4\%$. If the mobile station does find a match, it must remain awake for the second frame. The mobile station may again perform partial address comparison after receiving the second frame. The mobile station compares the 16 bits from each of the four messages received so far to the corresponding 16 bits of its address. If there is no match, the mobile station is allowed to stop demodulating the F-CCCH. When there is no message in the slot for the mobile station, the probability (assuming that address bits in the frame are random) that the mobile station is allowed to stop demodulating the F-CCCH after the second frame is: $(1-1/65536)^4 = 99.994\%$.

The goal of partial address comparison is to save power and thus preserve the life of the mobile station's power source. When a mobile station receives a frame of an F-CCCH slot, performs partial address comparison, and determines that there are no address matches, it conserves power which would otherwise be required to continue monitoring the F-CCCH. The mobile can take many steps to conserve power, including, but not limited to one or more of the following:

1. Turning off/removing power from a radio receiver;
2. Turning off/removing power from hardware performing despreading;
3. Turning off/removing power from hardware performing deinterleaving;
4. Turning off/removing power from hardware performing decoding;
5. Not turning on/applying power to hardware performing despreading;
6. Not turning on/applying power to hardware performing deinterleaving;
7. Not turning on/applying power to hardware performing decoding;

8. Not executing software instructions used to perform deinterleaving; or
9. Not executing software instructions used to perform decoding.

Figure 5:
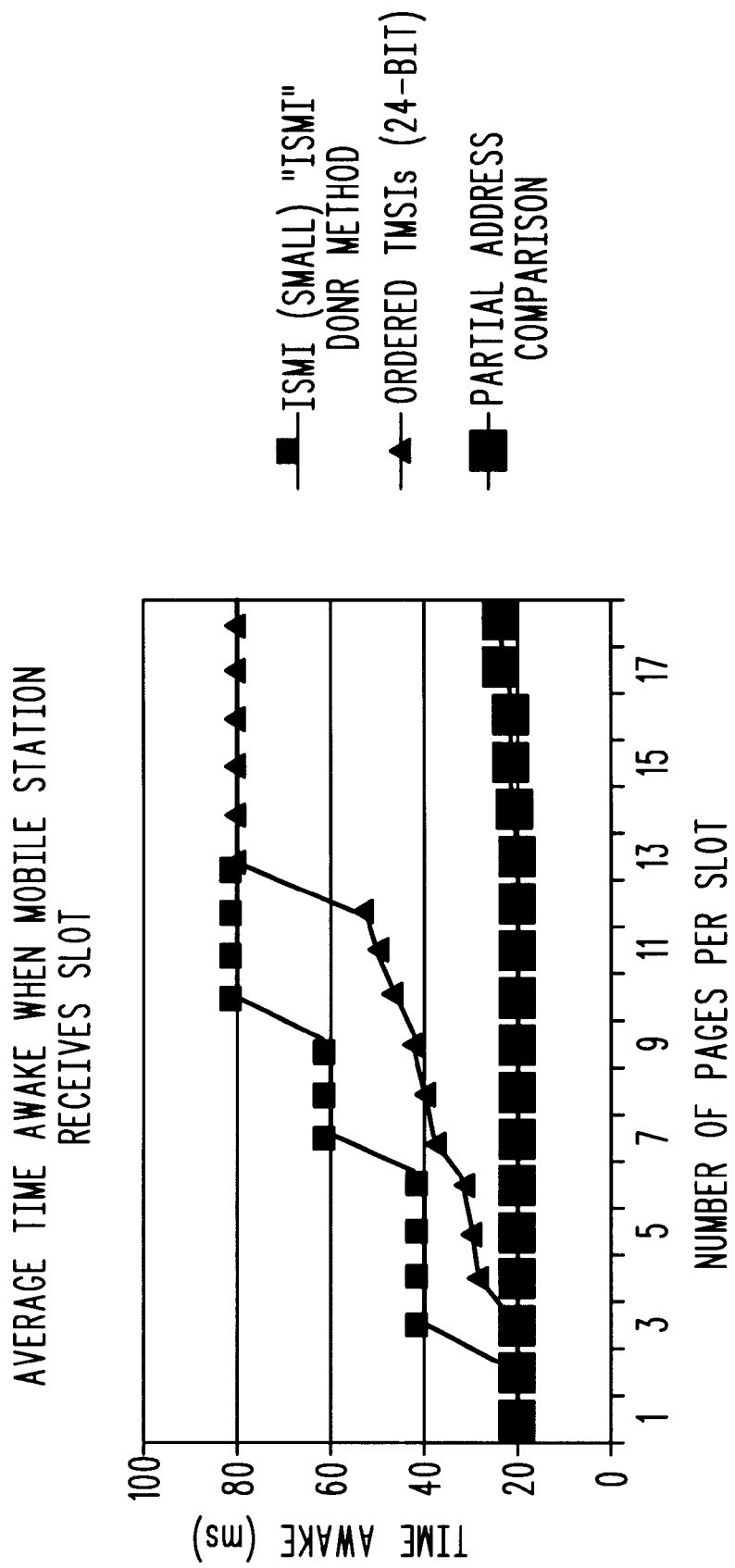
FIG. 5 shows the performance of partial address comparison and compares it to the performance of prior-art battery saving methods.

FIG. 5 shows the performance of partial address comparison and compares it to the performance of battery saving methods included in Standard 95-B, "Mobile Station-Base Station Compatibility Standard for Dual-Mode Spread Spectrum Systems" (TIA/EIA-95-B). It should be noted that the performance of partial address comparison is unrelated to the size of the address types being used for paging. The performance of cdma2000 power-saving techniques as illustrated in TIA/EIA-95-B becomes worse as the sizes of the address types being used for paging increase. FIG. 5 shows performance for both Temporary Mobile Station Identity (TMSI) and International Mobile Station Identifier (IMSI) addresses.

FIG. 6 shows the organization of slot 600 in accordance with one embodiment of the present invention. As shown, first frame 601 contains a first message (Quick Page Message) that is fully contained within first frame 601. Likewise, second frame 602 and third frame 603 contain a second message (Quick Page Continuation Message). Fourth frame 604 contains mobile station directed messages which may include messages addressed to mobile stations operating in the slotted mode. The first and second Quick Page Continuation Messages are fully contained within second 602 and third 603 frames, respectively. The Quick Page Message and both of the Quick Page Continuation Messages include both a LENGTH field and a CRC field. The paging information is included within the three messages. The Quick Page Message contains as much information as possible so that it fits exactly within first frame 601. The same applies to the Quick Page Continuation Message in second frame 602. Since each message is fully contained within a frame, a mobile station has the opportunity to decode a new message after receiving each frame. For example, a mobile station would wake up in time to receive first frame 601 of slot 600, would receive first frame 601, would deinterleave and decode first frame 601, and would process the Quick Page Message. Upon processing the Quick Page Message, a mobile would be able to cease demodulation for the rest of slot 600 if it is able to determine that no page directed to it is included in the slot (i.e., no partial address match for the mobile). If a mobile is not able to make such a determination after processing the Quick Page Message, it receives the second frame and processes the Quick Page Continuation Message. Upon processing the Quick Page Continuation Message, a mobile would be able to sleep for the rest of the slot if it is able to determine that no page directed to it is included in slot 600. Processing of third frame 603 is similar.

For a mobile station directed message for a slotted mode mobile station included in the slot after the Quick Page Message and Quick Page Continuation Messages, the address or a portion of the address of the mobile station to which the message is directed is included in the Quick Page Message/Quick Page Continuation Messages formatted as discussed above. There are two methods which can be used to do this. The first method includes only 16 address bits of the mobile station in the Quick Page Message/Quick Page Continuation Messages; the full address is then included in the mobile station directed message. Including the 16 bit portion of the mobile station's address in the Quick Page Message/Quick Page Continuation Messages forces the mobile station to stay awake to receive the message later in the slot (or potentially in the next slot). The second method includes the full address of the mobile station in the Quick Page Message/Quick Page Continuation Messages; the full address forces the mobile station to stay awake. The mobile station directed message is then addressed with a compressed address type which refers back to the slot and the position within the Quick Page Message/Quick Page Continuation Messages that the mobile station's address occurred. The mobile station remembers the position of the page directed to it and thus the compressed address type links the message with the mobile station's address.

FIG. 7 shows the organization of slot 700 in accordance with a second embodiment of the present invention. For this embodiment first frame 701 contains a Quick Page Message. The Quick Page Message is fully contained within first frame 701. A Quick Page Continuation Message is included in second and third frames 702–703. Fourth frame 704 contains mobile station directed messages which may include messages addressed to mobile stations operating in the slotted mode. Bits are saved over the previous figure in that one LENGTH field and one CRC field are eliminated. However, mobile stations must remain awake for the third frame before they have a second opportunity to determine whether they can sleep for the remainder of slot 700. However, the percentage of the population of mobile stations sleeping after the first frame is often so high that the effect of moving the second sleep opportunity to the end of third frame 703 is negligible. The infrastructure could potentially choose between organization shown by FIG. 6 and FIG. 7 based upon the percentage of the population of mobile stations sleeping after receiving the first frame. If the percentage of the population is high, FIG. 7 is preferred; if the percentage of the population is lower, FIG. 6 is preferred.

Regardless of frame organization, if the number of bits available for message address information in the first frame in the slot is large enough such that addresses for all messages in the slot fit in the first frame in the slot, all message addresses are included in the first frame. If the number of bits available for message address information in the first frame in the slot is not large enough to accommodate all address bits for all messages in the slot, the available bits in the first frame are divided roughly equally between all messages. For example, if 112 bits are available for 14 messages, 8 address bits are allocated for each message in the first frame (in this case the number of available bits is evenly divisible by the number of messages.) If 112 bits are available for 15 messages, 7 address bits are allocated for each of 8 messages in the first frame and 8 bits are allocated for each of 7 other messages in the first frame (in this case the number of available bits is not evenly divisible by the number of messages.) When the number of available bits for message address information is not evenly divisible by the number of messages, the number of bits allocated for any message is never more than one bit different from the number of bits allocated for any other message. When the mobile station receives the first paging channel frame, it compares the portion of each address present in the frame to the corresponding portion of its own address. If there is no match for any of the portions, then the mobile is allowed to sleep for the remainder of the slot. If there is a match for any of the portions, the mobile must remain awake (at least) for the next frame of the slot.

Dividing the bits equally or roughly equally between all messages in the slot increases the probability that there will be no partial address match and the mobile station can go to sleep. In the first example (112 bits available for 14 messages), the probability (assuming random address bits) that the mobile station will not match a single 8-bit partial address is $(1-\frac{1}{2}^8)=99.6\%$. The probability (assuming random address bits) that the mobile station will not match any of the addresses is: $(1-\frac{1}{2}^8)^{14}=94.67\%$. Suppose that, instead of allocating 8 bits to each of the 14 messages, 7 bits are allocated to 1 message, 8 bits are allocated to each of 12 messages, and 9 bits are allocated to 1 message. The probability (assuming random address bits) that the mobile station will not match any of the address bits is: $(1-\frac{1}{2}^7)(1-\frac{1}{2}^8)^{12}(1-\frac{1}{2}^9)=94.48\%$. Dividing the bits unevenly between the messages reduces the probability that there will be no partial address matches (and thus increases the probability that a mobile station will have to stay awake for an additional frame). In the second example (112 bits available for 15 messages), 7 address bits are allocated for each of 8 messages and 8 address bits are allocated for each of the other 7 messages. The probability (assuming random address bits) that the mobile station will not match any of the addresses is: $(1-\frac{1}{2}^7)^8(1-\frac{1}{2}^8)^7=91.38\%$. Suppose that instead, 9 address bits are allocated for 1 message, 7 address bits are allocated for each of 9 messages, and 8 address bits are allocated for each of the other 5 messages. The probability (assuming random address bits) that the mobile station will not match any of the addresses is: $(1-\frac{1}{2}^9)(1-\frac{1}{2}^7)^9(1-\frac{1}{2}^8)^5=91.20\%$. Again, dividing the bits unevenly between the messages reduces the probability that there will be no partial address matches (and thus increases the probability that a mobile station will have to stay awake for an additional frame).

In order to maximize the effectiveness of partial address comparison, the address bits present in the first frame must be as random as possible in order to create a high probability of mismatch. For example, in TIA/EIA-95-B, a 4-bit page record format is included for each page. The page record format can be considered part of the mobile's address. However, the page record formats included in a paging slot are unlikely to be very random. For example, in a system using TMSIs, it would be likely to have all messages in a slot use the format '1001' (24-bit TMSI) and to have all mobile stations also match this type of address. Thus, to include the page record format as part of the partial address in the first frame of a slot would provide no information enabling mobile stations to sleep since all mobile stations would match on this portion of the address. Because the page record format with the smallest number of address bits has 16 address bits, and because a 16-bit partial address comparison gives a high probability of mismatch, the page record format is ideally included in the paging channel slot after including the least significant bits of the address included with the page record format. After the page record format field, the remainder of the address bits which must be included are included. For any page record format with a variable number of address bits, the field that specifies the length of the variable portion is then included, followed by the variable portion. For example for page record format '1011', the least significant 16 bits of TMSI_CODE_ADDR would be first, followed by '1011', followed by the next most significant 16 bits of TMSI_CODE_ADDR, followed by TMSI_ZONE_LEN, followed by TMSI_ZONE.

For individually directed cdma2000 messages, there are two types of addresses that must be matched by the mobile: IMSI (first) and TMSI (second). According to TIA/EIA-95-B, a mobile must respond when paged with a first address, even if it has been assigned a second. Because the page record format is included after the 16 least significant bits of the address, this could potentially create the need for the mobile to compare each of the partial addresses to both a portion of its IMSI and to a portion of its TMSI (and thus doubling the probability of a match.) In order to avoid the need for the mobile to compare each of the partial addresses to both its IMSI and its TMSI, the mobile is notified which of the addresses are IMSIs and which are TMSIs. In the first frame, the number of first and second addresses included in the slot are identified by a 4-bit NUM_SL_IMSI field, and a 5-bit NUM_SL_TMSI field, respectively. In addition, 1-bit SL_IMSI_INCLUDED and SL_TMSI_INCLUDED fields are included which specify whether there are slotted mode messages directed to IMSIs or TMSIs included in the slot. If there are no IMSIs directed to slotted mode mobile stations in the slot, the NUM_SL_IMSI field is omitted. Similarly, if there are no TMSIs directed to slotted mode mobile stations in the slot, the NUM_SL_TMSI field is omitted.

Transmission equipment will order the IMSIs and TMSIs in the slot in a predetermined manner so that the mobile will know which partial addresses are part of IMSIs and which partial addresses are part of TMSIs based upon the number of IMSIs and TMSIs. When a mobile performs partial address comparison when it does not have a TMSI assigned, it will perform partial address comparison with its IMSI only with the partial addresses in the slot known to be part of IMSIs; the partial TMSIs can be ignored. When a mobile performs partial address comparison when it does have a TMSI assigned, it will perform partial address comparison by comparing part of its IMSI only with the partial addresses in the slot known to be part of IMSIs and by comparing part of its TMSI only with the partial addresses in the slot known to be part of TMSIs. If there are more than 2 slotted messages of type TMSI, more than 1 slotted message of type IMSI or if there are more than 6 messages with a mixture of IMSIs and TMSIs, this technique provides greater probability of sleep than if 1 bit per message were included in the first frame to distinguish IMSIs from TMSIs (this assumes that a 5-bit field representing number of messages would be used instead of the SL_IMSI_INCLUDED, SL_TMSI_INCLUDED, NUM_SL_IMSI field, and NUM_SL_TMSI fields when 1 bit per message is devoted to specifying IMSI or TMSI). The reason the probability of sleep is greater is that there are more bits available for partial addresses earlier in the slot.

In order to maximize the randomness of the partial address bits earliest in the slot (and thus maximizing the probability of a partial address mismatch), the least significant 16 address bits are used first in the slot for each message, beginning with the least significant bit of each address earliest in the slot and continuing with the next most significant 15 bits from less significant to more significant. In general, the least significant bits of an address such as an IMSI address will be more random than the more significant bits. After the least significant 16 bits have been included for each message, the remaining fields for each message are included, all remaining bits for each message at a time and not interleaved as with the least significant 16 bits. The reason for including the remaining bits in this manner rather than interleaving as with the least significant 16 bits is to simplify the message parsing for the mobile station and to simplify the creation of the message for the base station. It would also be possible to interleave the remaining bits as done with the least significant 16 bits to even further increase the probability of a partial address mismatch, but based upon the anticipated number of bits per frame and anticipated number of messages per slot for cdma2000, the increase in the probability of a partial address mismatch is negligible. For cdma2000, the simplified parsing makes it worthwhile to not interleave address bits after the least significant 16.

For cdma2000 the message structure includes a reserved address type (using fields NUM_SL_RESERVED_T, RESERVED_ADDR_x, etc.) It is anticipated that in the future it may be desirable to add a third address type (such as an Internet Protocol (IP) address) which could be used to page mobile stations for data applications. A mobile capable of data would not necessarily need to have an IMSI assigned; it could be assigned a TMSI. In a future version of the cdma2000 standard, the reserved fields could be redefined to be used to page mobile stations with IP addresses. Because the fields have been reserved and mobiles according to the first version of the standard would be able to interpret the messages, IP addresses could be introduced with no backward compatibility problems. Mobiles with IP addresses assigned could perform partial address comparison in much the same way as mobiles with IMSI addresses assigned perform partial address comparison. In addition, there could be a mobile with both an IMSI address and an IP address. Such a mobile would perform partial address comparison of IMSI address bits with portions of its IMSI address and partial address comparison of IP address bits with portions of its IP address, and, if a TMSI is assigned, partial address comparison of TMSI address bits with portions of its TMSI.

When broadcast messages must be sent on the F-CCCH, the message structure includes the broadcasting of addresses earliest in the paging channel slot, before the partial addresses for messages directed to individual mobile stations. Typically broadcast messages are not sent, but when they are, including the complete broadcast addresses earliest in the slot creates the maximum probability for mobile stations to go to sleep as early as possible. Because the bits of broadcast messages are not very random, it is preferable to include the entire address earlier in the slot rather than a partial address. Thus, in the preferred embodiment of the present invention if a broadcast message is scheduled, the whole broadcast address is included in the message prior to any mobile station addresses. If a only portion of a broadcast address were included in the first frame, a mobile station waking up to search for a broadcast address match would likely have to stay awake for the second frame to determine a partial address mismatch because the bits of the broadcast address are not very random.

According to TIA/EIA-95-B, if all messages queued for a paging channel slot do not fit into the slot, some of the messages can be carried over into the next slot. When this occurs, all mobile stations assigned to that slot must receive both all of that slot and at least part of the subsequent slot. The result is that, in periods of high paging channel load, mobile stations can sometimes be forced to stay awake as long as 160 ms when they wake up for their slot. Partial address comparison can be used to allow the mobile to sleep longer when messages are carried over to the next slot. In the header of the Quick Page Message, a READ_NEXT_SLOT bit is included. The infrastructure sets this bit to indicate to mobile stations that messages are carried over into the next slot. If a mobile station wakes up for its slot, receives the first frame, determines that the READ_NEXT_SLOT bit is set, and determines using partial address comparison that there are no messages directed to it in its slot, it may go to sleep for the remainder of the slot and then wake up for the beginning of the next slot.

FIG. 8 shows an example of how partial address comparison can be used to increase battery life when all messages for an assigned slot do not fit into the slot. For first slot 801, the infrastructure has more messages queued than fit into the slot. The infrastructure fits as many messages as it can in first slot 801 and sets the READ_NEXT_SLOT bit in the Quick Page Message in the first frame of first slot 801. In the next slot shown (second slot 802), the infrastructure includes the messages which did not fit into first slot 801. An example mobile station assigned to slot 801 begins demodulating in time to receive the first frame of slot 801 (the mobile station's assigned slot). The mobile station decodes the Quick Page Message and performs partial address comparison using the partial addresses included in the Quick Page Message. The mobile station finds no match and stops demodulating the F-CCCH after the first frame of its assigned slot. Because the READ_NEXT_SLOT bit in the Quick Page Message from its assigned slot is set to '1', the mobile station begins demodulating in time to receive the first frame of the next slot (slot 802). The mobile station decodes the Quick Page Message and performs partial address comparison using the partial addresses included in the Quick Page Message. The mobile station finds no match and again stops demodulating the F-CCCH. The mobile station then does not demodulate the F-CCCH again until its next assigned slot.

Figure 9:
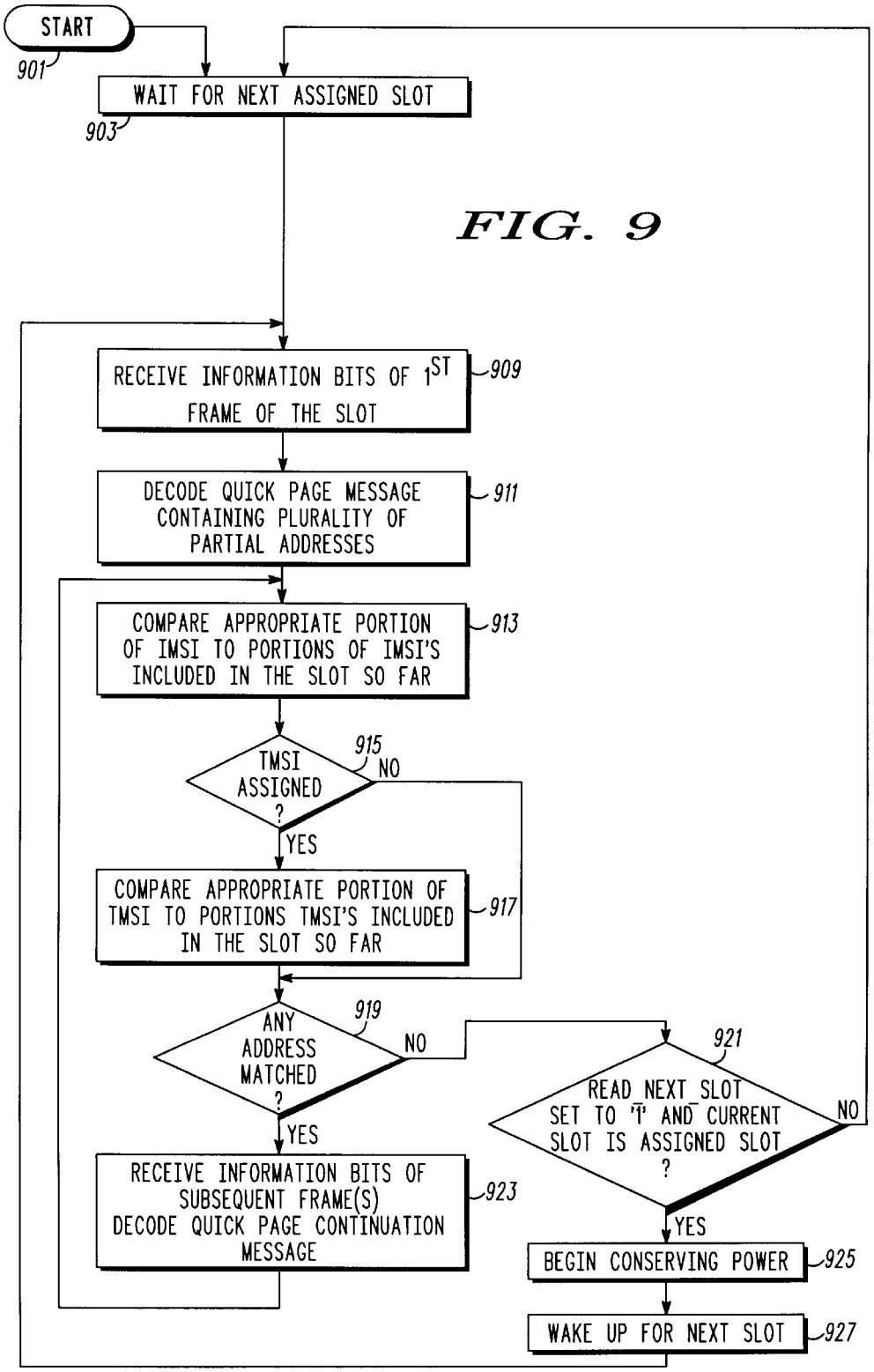
FIG. 9 is a flow chart of a mobile using a method for extending battery life in accordance with the preferred embodiment of the present invention.

FIG. 9 is a flow chart of a mobile using a method for extending battery life in accordance with the preferred embodiment of the present invention. The flow chart in FIG. 9 is used when the mobile station is in slotted mode except in the Suspended Virtual Traffic Substate or when a Priority Access and Channel Assignment (PACA) call is queued. The logic flow begins at step 901 and continues to step 903 where the mobile station waits for the next assigned slot. The mobile station conserves power (sleeps) while waiting for the next assigned slot. The mobile station then wakes up when it is time to receive its assigned slot. The logic flow then continues at step 909, where information bits of the first frame of the slot are received. The logic flow then continues to step 911 where a Quick Page Message is decoded to determine address information for all messages within the slot. At step 913 the mobile station compares the portion of each IMSI address included in the slot so far with the corresponding bits of its IMSI to determine if there is a match. The logic flow then continues to step 915 where the mobile station determines if it has been assigned a TMSI. If the mobile station determines that it has not been assigned a TMSI, the logic flow continues to step 919; otherwise, the logic flow continues to step 917. At step 917 the mobile station compares the portion of each TMSI address included in the slot so far with the corresponding bits of its TMSI to determine if there is a match. The logic flow then continues to step 919 where the mobile station determines if there are any matches (as determined in steps 913 and 917). If there were not any address matches, the logic flow continues at step 921; otherwise the logic flow continues at step 923 where the mobile station receives the information bits of at least one subsequent frame and decodes a Quick Page Continuation Message to determine more address information for messages in the slot. The logic flow continues at step 913.

At step 921 the mobile station determines if both the READ_NEXT_SLOT bit for the current slot is set to '1' and the current slot is the mobile station's assigned slot. If the result of step 921 is negative, then the logic flow returns to step 903. If the result of step 921 is positive, then the logic flow continues at step 925 where the mobile station begins conserving power (goes to sleep). After step 925, the logic flow continues at step 927 where the mobile station waits for the beginning of the next slot and wakes up for the next slot. The logic flow then returns to step 909.

Figure 10:
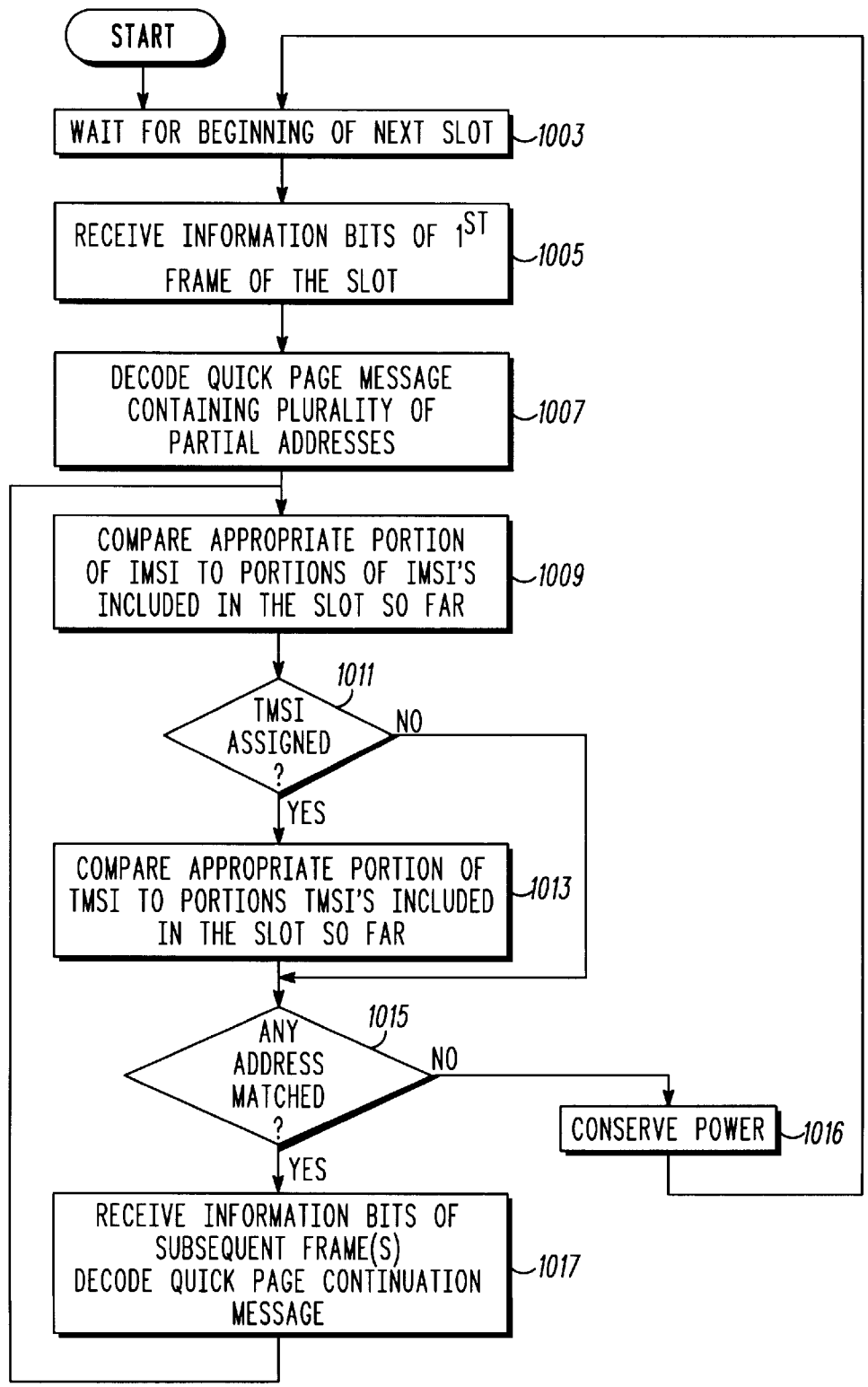
FIG. 10 shows a flow chart of a mobile using a method for extending battery life in accordance with a preferred embodiment of the present invention.

FIG. 10 shows a flow chart of a mobile using a method for extending battery life in accordance with a preferred embodiment of the present invention. This process is used when the mobile station is in slotted mode when in the Suspended Virtual Traffic Substate or when a PACA call is queued. The mobile station monitors at least one frame of every slot. The logic flow begins at step 1001 and continues to step 1003 where the mobile station waits for the beginning of the next slot. At step 1005 the mobile station receives the information bits of the first frame of the slot. As discussed above, the first portion of the first slot contains address information as described above with reference to FIG. 4. The logic flow then continues to step 1007 where a Quick Page Message is decoded to determine address information for all messages within the slot. At step 1009 the mobile station compares the portion of each IMSI address included in the slot so far with the corresponding bits of its IMSI to determine if there is a match. The logic flow then continues to step 1011 where the mobile station determines if it has been assigned a TMSI. If the mobile station determines that it has not been assigned a TMSI, the logic flow continues to step 1015; otherwise, the logic flow continues to step 1013. At step 1013 the mobile station compares the portion of each TMSI address included in the slot so far with the corresponding bits of its TMSI to determine if there is a match. The logic flow then continues to step 1015 where the mobile station determines if any there are any matches (as determined in steps 1009 and 1013). If there were not any address matches, the logic flow continues to step 1016, otherwise the logic flow continues to step 1017 where the mobile station receives the information bits of at least one subsequent frame and decodes a Quick Page Continuation Message to determine more address information for messages in the slot. At the logic flow then returns to step 1009. At step 1016 the mobile station begins conserving power (goes to sleep). After step 1016, the logic flow returns to step 1003.

Figure 11:
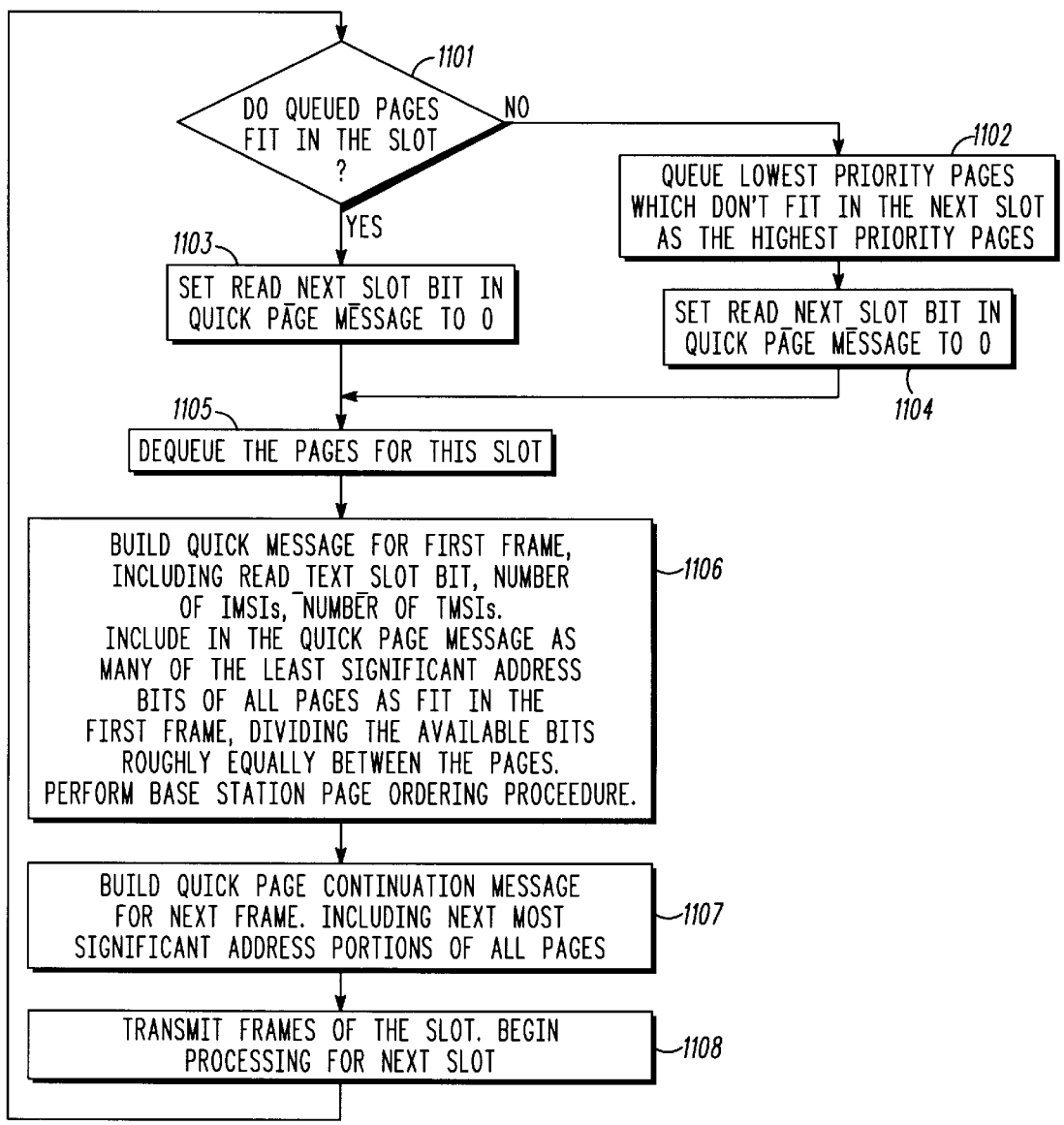
FIG. 11 is a flow chart of a base station using partial-addresses paging in accordance with the preferred embodiment of the present invention.
Figures 12, 13:
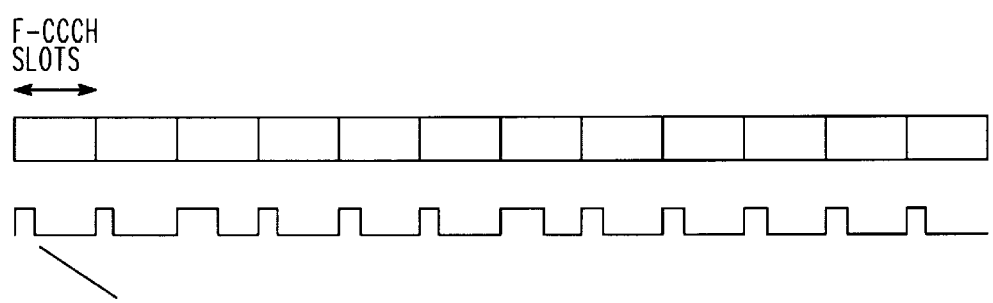
FIG. 12 shows the ordering of address bits in accordance with the preferred embodiment of the present invention.
FIG. 13 shows an example of how partial address comparison in accordance with the preferred embodiment of the present invention reduces the mobile station duty cycle for demodulating a paging channel.

FIG. 11 is a flow chart of infrastructure using partial-addresses paging in accordance with the preferred embodiment of the present invention. The logic flow begins at step 1101 where the infrastructure determines if all queued messages can fit into the next slot. If at step 1101 the infrastructure determines that all queued messages cannot fit into the current slot, then the logic flow continues to step 1102. If at step 1101 the infrastructure determines that all queued messages can fit into the current slot, then the logic flow continues to step 1103. At step 1102 the lowest priority messages which do not fit in the current slot are queued for the next slot as the highest priority messages (i.e. to be dequeued first). The logic flow then continues at step 1104 where the READ_NEXT_SLOT bit for the Quick Page Message to be sent in the current slot is set to '1'. After step 1104, the logic flow continues at step 1105. At step 1103 the READ_NEXT_SLOT bit for the Quick Page Message to be sent in the current slot is set to '0'. The logic flow then continues at step 1105 where the infrastructure dequeues the messages for the current slot. At step 1106, the infrastructure builds the Quick Page Message for the first frame of the current slot, including the READ_NEXT_SLOT bit, the number of IMSI addresses, the number of TMSI addresses, and as many of the least significant address bits of all messages as fit in the first frame, dividing the available bits roughly equally between the messages. The base station builds the Quick Page Message, including as many of the least significant address bits as possible in the first frame of the slot, dividing the available bits roughly equally between the messages. Preferably the base station page ordering procedure is performed to maximize the percentage of the mobile population which can sleep after the first frame when each page is not allocated the same number of bits in the first frame. At step 1107 the infrastructure builds the Quick Page Continuation Message for the next frame, including the next most significant address portions of all messages for the slot. The logic flow then continues at step 1108 where the infrastructure transmits the frames of the slot and begins processing for the next slot. The logic flow then returns to step 1101. When there are an equal number of partial address bits in the first frame allocated to each mobile station being paged, the order of the messages in the first frame has no impact on the percentage of the mobile population which will be allowed to sleep. However, if some mobile stations being paged are allocated a different number of partial address bits in the first frame than other mobile stations, the order of the messages in the first frame becomes important. For example, suppose that there are 12 mobile stations being paged, all with TMSI addresses, and with 30 partial address bits allocated in the first frame. In the first frame, three partial address bits are available for 6 of the mobile stations. In the first frame, two partial address bits are available for the other 6 mobile stations. The left column of FIG. 12 shows the least significant three bits of the 12 mobile stations being paged in a random order. Messages numbered 1 to 6 each have three partial address bits. Messages numbered 7 to 12 each have two partial address bits. 100% of the mobile stations with TMSIs assigned have either '00', '01', '10', or '11' as the least significant two bits of their TMSI. The mobile stations with '00' as their least significant two bits will be forced to stay awake for the second frame because of a partial address match with messages 7, 11, and 12. The mobile stations with '01' as their least significant two bits will be forced to stay awake for the second frame because of a partial address match with message 9. The mobile stations with '10' as their least significant two bits will be forced to stay awake for the second frame because of a partial address match with message 8. The mobile stations with '11' as their least significant two bits will be forced to stay awake for the second frame because of a partial address match with message 10. Thus, in this particular case, there is no benefit to partial address comparison (after the first frame) because 100% of the population of mobile stations with TMSIs assigned will have partial address matches and will have to remain awake for the second frame. In the preferred embodiment of the present invention the order of the address bits within the slot is rearranged in an order which allows some of the mobile stations with TMSIs assigned to go to sleep after the first frame. The messages are grouped into sets of messages, each set consisting of messages which have the same least significant two bits. The sets are then sorted according to the number of members. The sets with the fewest number of members will be included first followed by sets with a larger number of members. If there are any sets with the same number of members, then, of these sets, any sets which contain members whose least significant three bits are all identical are ordered first.

The middle column of FIG. 12 shows the order after the reordering of the messages in the first column. The first set consists of a single message (message 10) with least significant two bits of '11'. The second set consists of three messages (3, 4, and 8) with least significant two bits of '10' (and with least significant three bits of '110'). The third set consists of three messages (5, 6, and 9) with least significant two bits of '01'. The fourth set consists of five messages (1, 2, 7, 11, and 12) with least significant two bits of '00'. The messages ordered first are allocated a larger number of partial address bits as is shown in the rightmost column of FIG. 12. Messages 10, 3, 4, 8, 5, and 6 are all allocated three partial address bits in the first frame. Messages 9, 1, 2, 7, 11, and 12 are all allocated two partial address bits in the first frame. 100% of the mobile stations with TMSIs assigned have either '000', '001', '010', '011', '100', '101', '110', or '111' as the least significant three bits of their TMSI. Assuming a large population of mobile stations with random TMSIs assigned, 12.5% have '000' for the least significant three bits of their TMSI, 12.5% have '001', 12.5% have '010', 12.5% have '011', 12.5% have '100', 12.5% have '101', 12.5% have '110', and 12.5% have '111'. According to the ordering shown in the rightmost column of the FIG. 12, the 25% of the mobile stations with TMSIs assigned which have either '000' or '100' for the least significant three bits of their TMSI will be required to stay awake for the second frame due to the partial address match with messages 1, 2, 7, 11, and 12. According to the ordering shown in the rightmost column of FIG. 12, the 25% of the mobile stations with TMSIs assigned which have either '001' or '101' for the least significant three bits of their TMSI will be required to stay awake for the second frame due to the partial address match with message 9. According to the ordering shown in the rightmost column of FIG. 12, the 12.5% of the mobile stations with TMSIs assigned which have '110' for the least significant three bits of their TMSI will be required to stay awake for the second frame due to the partial address match with messages 3, 4, and 8. According to the ordering shown in the rightmost column of FIG. 12, the 12.5% of the mobile stations with TMSIs assigned which have '011' for the least significant three bits of their TMSI will be required to stay awake for the second frame due to the partial address match with message 10. According to the ordering shown in the rightmost column of FIG. 12, 25% of the mobile stations with TMSIs assigned will have no partial address match after the first frame and will be allowed to sleep after the first frame. According to the ordering shown in the rightmost column of FIG. 12, mobile stations with TMSIs assigned which have either '111' or '010' for the least significant three bits of their TMSI will be allowed to sleep after the first frame. In this particular case, the reordering of the messages allows 25% of mobile stations to sleep after the first frame where random ordering of the messages would not have allowed any mobile stations to sleep after the first frame.

Although FIG. 12 is illustrated using TMSIs addresses, one of ordinary skill in the art will recognize that other address schemes may be used. For example, an IMSIs address scheme could also be used. The following procedure generalizes the above example where some of the messages in the first frame are allocated z partial address bits and the remaining messages are allocated z+1 partial address bits:

1. The messages are grouped into sets of messages, each set consisting of messages which have the same least significant z bits. (The order of the messages within these sets is unimportant.).

2. The sets are then sorted according to the number of members. The sets with the fewest number of members will be included first followed by sets with a larger number of members.

3. If there are any sets with the same number of members, then of these sets, any sets which contain members whose least significant z+1 bits are all identical are ordered first.

4. The messages ordered first are allocated a larger number of partial address bits.

Selecting the best messages for which to allocate z partial address bits is the important aspect of this procedure. The messages are divided into two groups, one group for which z partial address bits are allocated, and one group for which z+1 partial address bits are allocated. Once the membership of these groups is determined, the order of messages within the groups is not important as long as the number of partial address bits for the messages in the groups remains the same.

The benefit of step 3 can be shown in the above example. If one member of the set consisting of messages 3, 4, and 8 had been allocated two bits instead of three (as could have been the case without step 3), then the mobiles whose least significant three TMSI bits are '010' would not have been allowed to sleep after the first frame because of a partial address match with the least significant two bits '10'. Since the set consisting of messages 5, 6, and 9 has members with least significant three TMSI bits of both '001' and '101', it is not a disadvantage to allocate two partial address bits to one member; it is a disadvantage to allocate two partial address bits for the set consisting of messages 3, 4, and 8. The result of not following step 3 could be having 12.5% of the population of mobiles with TMSIs assigned go to sleep after the first frame rather than 25%.

The descriptions of the invention, the specific details, and the drawings mentioned above, are not meant to limit the scope of the present invention. For example, partial address comparison can be used to reduce mobile station power consumption in the Suspended Virtual Traffic substate of the Suspended Packet Data State. Rather than monitor the F-CCCH continuously, mobile stations in this substate begin demodulating in time to receive the first frame of each F-CCCH slot. If partial address comparison gives a mismatch, the mobile may stop demodulating for the remainder of the slot and then resume demodulating in time for the next slot. FIG. 13 shows an example of how partial address comparison in accordance with the preferred embodiment of the present invention reduces the mobile station duty cycle for demodulating a paging channel (F-CCCH). Currently, according to TIA/EIA-95-B, when a PACA call is queued for a mobile station, it monitors the paging channel continuously. Partial address comparison can also be used to reduce mobile station power consumption when a PACA call is queued. Monitoring is the same as for the Suspended Virtual Traffic substate of the Suspended Packet Data State. It is the intent of the inventor that various modifications can be made to the present invention without varying from the spirit and scope of the invention, and it is intended that all such modifications come within the scope of the following claims and their equivalents.

What is claimed is:

1. A method for transmitting address information within a communication system to mobile stations assigned to a slot utilized to transmit messages to the mobile stations, the method comprising the steps of: determining a subset of the mobile stations, wherein the subset of the mobile stations require messaging within the slot; determining addresses for all mobile stations within the subset; and transmitting within a first frame of the slot, a first unique address portion for each mobile station with the subset, wherein the first address portion for a mobile station comprises a portion of the mobile station's address that is less than the whole of the address for the mobile station, wherein the lengths of the first address portions are substantially equal and determined based on the number of first address portions being broadcast within the first frame.

2. The method of claim 1 further comprising the step of transmitting within a second frame of the slot, a second address portion for each mobile station within the subset, wherein the second address portion for a mobile station comprises a portion of the mobile station's address that is less than the whole of the address for the mobile station.

3. The method of claim 1 wherein the step of transmitting the first address portion for a mobile station within the subset comprises the step of transmitting a least significant portion of the mobile station's address.

4. The method of claim 1 wherein the step of determining addresses comprises the step of determining International Mobile Station Identifier (IMSI) addresses.

5. The method of claim 1 wherein the step of determining addresses comprises the step of determining Temporary Mobile Station Identity (TMSI) addresses.

6. The method of claim 1 wherein the step of transmitting comprises the step of transmitting within a Code Division, Multiple Access (CDMA) communication system.

7. A method for transmitting address information within a communication system, the method comprising the steps of: determining a first address of a first type for a first mobile station assigned to a paging slot; determining a second address of a second type for a second mobile station assigned to the paging slot; and transmitting within a first frame of the slot, a portion of the first address of the first type and a portion of the second address of the second type, differing from the portion of the first address of the first type, to the first and second mobile stations, wherein the lengths of all address portions transmitted in the first frame are substantially equal and determined based on the number of address portions being broadcast within the first frame.

8. The method of claim 7 wherein the step of determining an address of the first type comprises the step of determining an International Mobile Station Identifier (IMSI) address for the first mobile station.

9. The method of claim 7 wherein the step of determining an address of the second type comprises the step of determining a Temporary Mobile Station Identity (TMSI) address for the second mobile station.

10. The method of claim 7 further comprising the step of transmitting, within a second frame of the slot, second portions of the first and the second addresses.

11. The method of claim 7 wherein the step of transmitting portions of the first address of the first type and the second addresses of the second type comprises the step of transmitting least significant portions of the first address of the first type and the second address of the second type.

12. A method for transmitting address information within a communication system to a group of mobile stations assigned to a slot utilized to transmit messages, the method comprising the steps of:

determining a subset of the group of mobile stations that require paging within the slot;

determining addresses for mobile stations within the subset;

grouping the mobile stations within the subset into groups of mobile stations having the same least significant address bits to create a plurality of grouped mobile stations;

sorting the plurality of grouped mobile stations according to a number of members; and transmitting within a first frame of the slot, a first address portion for each mobile station within the subset, wherein the first address portion for a mobile station comprises a portion of the mobile station's address that is less than the whole of the address for the mobile station and the grouped mobile stations having a fewest number of members have a larger number of partial address bits within the first frame.

13. The method of claim 12 wherein the step of grouping comprises the step of grouping the mobile stations within the subset into groups of mobile stations having the same least significant address bits to create the plurality of grouped mobile stations wherein a first set of grouped mobile stations, of the plurality of grouped mobile stations, with identical least significant partial address bits have a larger number of partial address bits within the first frame than a second set of grouped mobile stations, of the plurality of grouped mobile stations, having the same number of members as the first set of grouped mobile stations.

14. The method of claim 12 further comprising the step of transmitting within a second frame of the slot, a second address portion for each mobile station within the subset, wherein the second address portion for a mobile station comprises a portion of the mobile station's address that is less than the whole of the address for the mobile station.

15. The method of claim 12 wherein the step of transmitting the first address portion for a mobile station within the subset comprises the step of transmitting a least significant portion of the mobile station's address.

16. A method for receiving address information within a communication system the method comprising the steps of: determining a slot time to receive messages; determining from information bits received within a first frame of the slot, first unique address portions for a plurality of mobile stations, wherein a first address portion for an individual mobile station comprises a portion of the mobile station's address that is less than the whole of the address for the mobile station, wherein the lengths of the first address portions of the mobile stations are substantially equal and determined based on the number of first address portions being broadcast within the first frame; and performing partial address comparison techniques to determine if the mobile station has a message pending.

17. The method of claim 16 further comprising the step of conserving power during a frame immediately following the first frame in response to the step of performing.

* * * * *